Aug. 22, 1967
G. LESSMAN
3,337,287
PROJECTION SYSTEM
Filed March 9, 1964
3 Sheets-Sheet 1
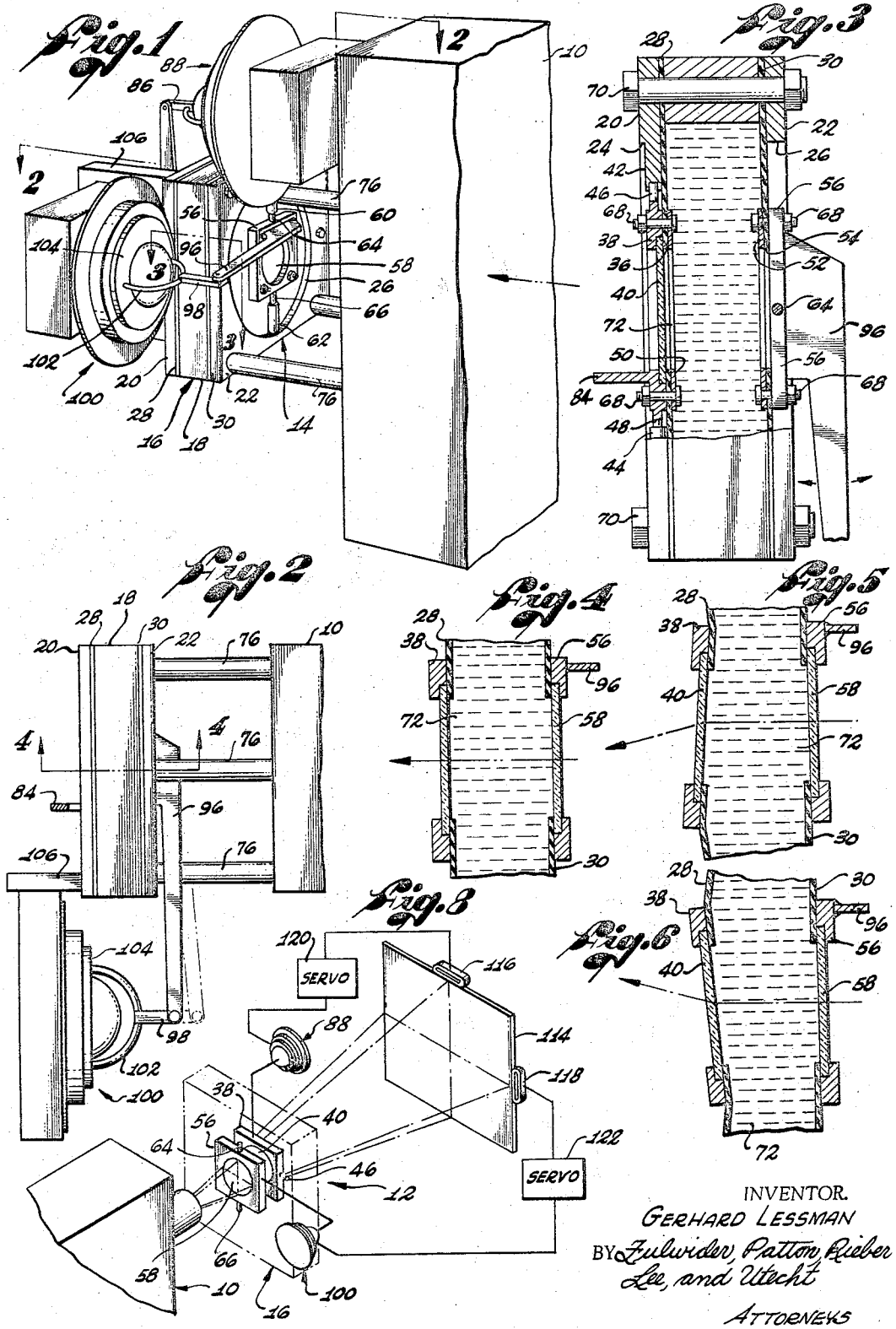
INVENTOR.
GERHARD LESSMAN
BY Fulwider, Patton, Rieber,
Lee, and Utecht
ATTORNEYS

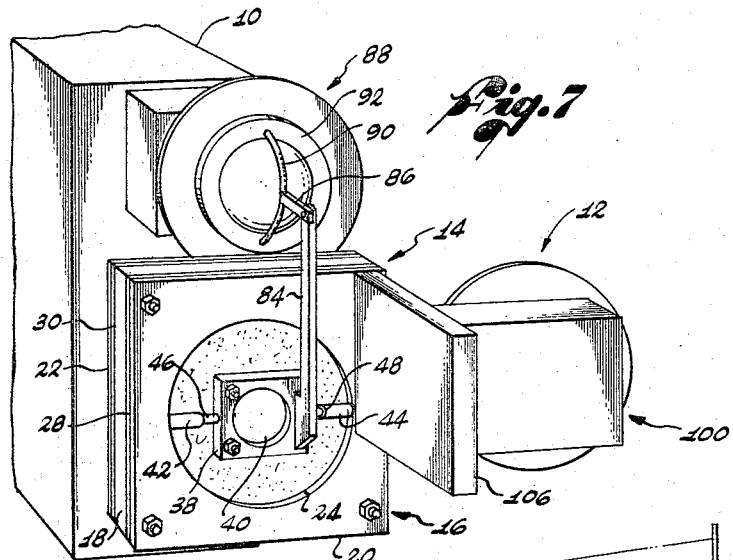
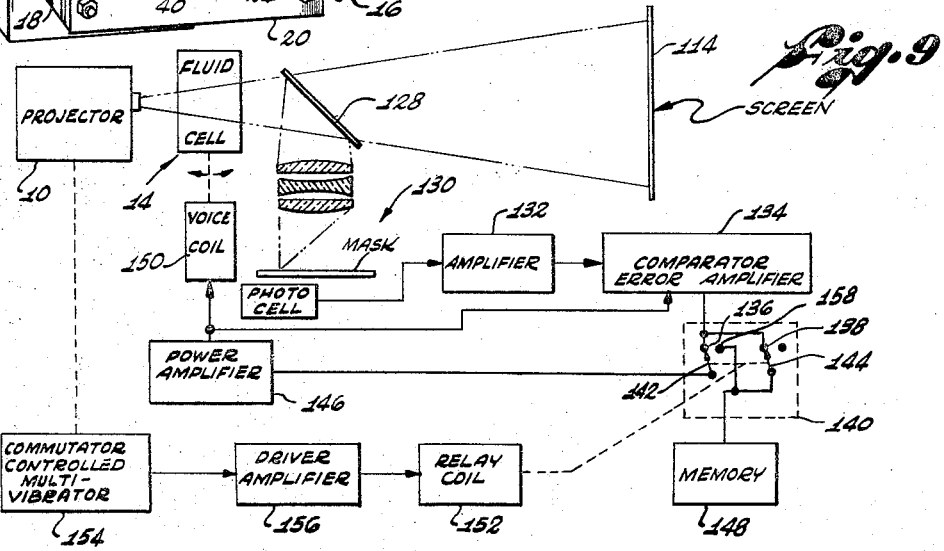
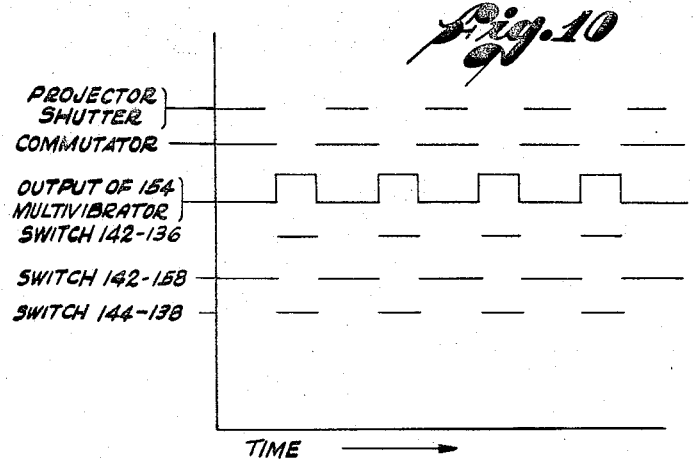

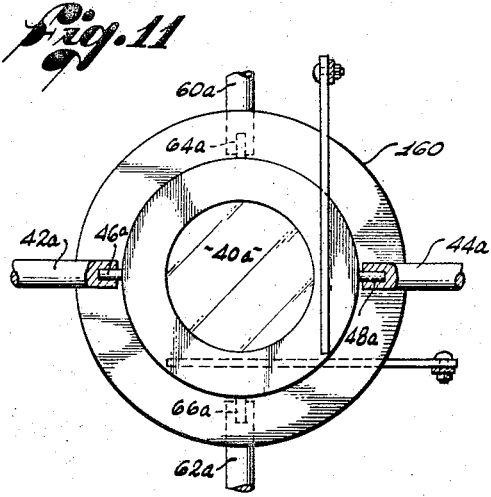
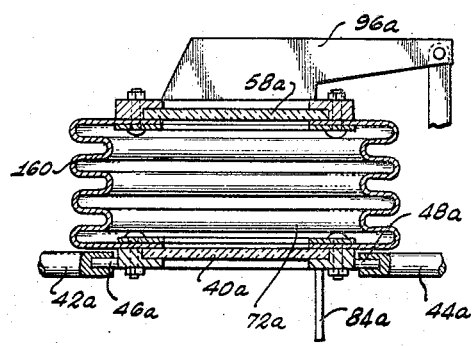
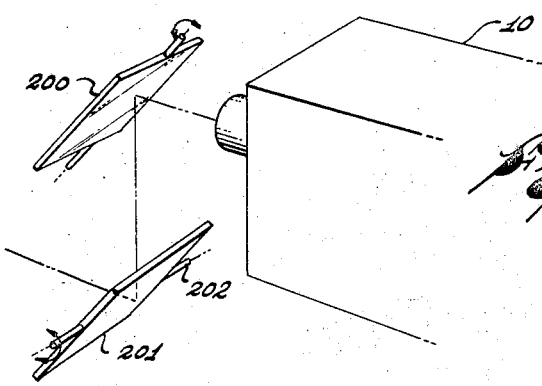
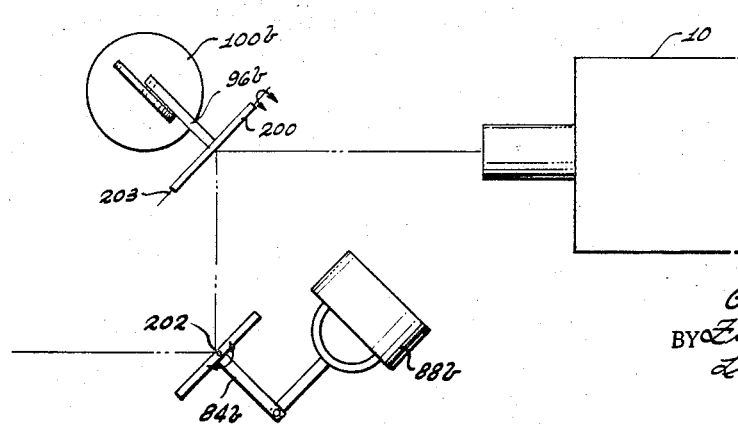
INVENTOR.
GERHARD LESSMAN

United States Patent Office 3,337,287
Patented Aug. 22, 1967

1

3,337,287
PROJECTION SYSTEM
Gerhard Lessman, Chino, Calif., assignor to Cinerama, Inc., New York, N.Y., a corporation of New York
Filed Mar. 9, 1964, Ser. No. 350,389
8 Claims. (Cl. 352—244)

This invention relates generally to a system for the projection of energy and, more especially, to a system for maintaining a projected pattern of energy in fixed relationship to the receiving surface. By way of example, the projection system of the present invention may be used to maintain an image of a motion picture fixed as to location upon a motion picture screen.

In the present systems for projecting motion pictures upon screen, it is common for the projected beam to be randomly deflected in both the horizontal and vertical directions during the projection of a motion picture film. Such deflections are disconcerting to the viewers and reduce their enjoyment in watching the picture. This characteristic of present-day systems is annoying where the projected image is designed to fill the entire screen so that a deflection causes a portion of the picture to be thrown off screen. The effect is even more undesirable in systems using a plurality of projectors wherein the mating or edge registration of the several projected images must be accurately maintained.

Such deflections can be caused by an almost infinite number of variables including wear or change in the dimension of the film, inaccuracies of a projector, vibration, or external forces acting on the projector or projectors. It is assumed, of course, that the screen and the seats or supports for the persons viewing the screen are rigidly connected. Clearly, movement of the screen would be most disconcerting, but it is usually a simple matter to mount the screen in a rigid and substantial fashion.

According to the present invention, a system is provided that stabilizes the path followed by the projected beam of energy, such as light, or expressed differently, the present system compensates for the deflections and eliminates their visual affect upon the viewers. In general, the beam may be stabilized by any one of a number of means, such as the positioning of a variable refractor or a variable reflector between the projector and the screen. The refractor may take the form of a prism having a variable angle controlled by a servo system which is instantaneously responsive to the deflections of the projected beam. Such a variable angle prism can take the form of a fluid filled cell having a pair of aligned, pivotally mounted windows, movement of which is controlled by suitable coils responsive to a servo system. The reflector system can take the form of a pair of angularly positioned pivotally mounted mirrors, the mirrors being controlled in a manner similar to that of the windows of the variable angle prism. Either of these systems is economical to manufacture, requires very little maintenance, and may easily be installed in present projection systems.

It is therefore a major object of the present invention to provide a system for stabilizing the position of a projected beam of energy on a receiving or intercepting surface.

It is another object of the invention to provide a projection system for motion pictures wherein undesired deflections of a projected image are immediately corrected.

It is a further object of this invention to provide such a system in which a variable refractor such as a variable angle prism is positioned between the projector and the screen, and the angle effect of the refractor is controlled in response to beam deflection.

Still another object of the invention is to provide such a system in which a variable reflector is positioned between the projector and the screen, and the reflector is positioned in response to beam deflection.

It is a still further object of the present invention to provide such a system in which photoelectric detection means are used to control the operation of the compensating means.

These and other objects and advantages of the present invention will become apparent from the following description and from the drawing accompanying that description in which:

FIGURE 1 is a perspective view looking forward from the left side of a projector showing the fluid cell assembly of the present invention;

FIGURE 2 is a plan view taken along lines 2—2 of FIGURE 1;

FIGURE 3 is an enlarged view, partly in section, taken along the lines 3—3 of FIGURE 1;

FIGURE 4 is a vertical, sectional view showing the windows of the variable angle prism of the present invention positioned to pass a beam of light directly therethrough;

FIGURE 5 is a vertical, sectional view showing the windows of the variable angle prism of FIGURE 4 positioned to deflect a beam of light downwardly;

FIGURE 6 is a view similar to FIGURE 5 showing the windows of the variable angle prism positioned to deflect a beam of light upwardly;

FIGURE 7 is a front perspective view of the liquid cell assembly shown in FIGURE 1;

FIGURE 8 is a perspective diagrammatic view of an installation utilizing the projection system of the present invention;

FIGURE 9 is a schematic block diagram of the electrical control circuit for the projection system of the present invention;

FIGURE 10 is a chart showing the condition of various circuit elements at various times in the projection cycle;

FIGURE 11 is a front elevational view of another form of variable angle prism;

FIGURE 12 is a horizontal sectional view of the form of variable angle prism shown in FIGURE 11, taken on the line 12—12;

FIGURE 13 is a perspective view similar to FIGURE 1 of a reflector system making use of a pair of pivotally mounted mirrors; and FIGURE 14 is a side elevational view of the reflector system shown in FIGURE 13.

Referring now to the drawings and particularly to FIGURES 1-3 and 7, there is shown a representation of a light image projector, in this case, a motion picture projector 10 to which is connected a variable angle prism assembly, indicated generally by the numeral 12. The variable angle prism assembly 12 includes a fluid cell 14 having a housing 16 that includes a central frame 18, a front plate 20, and a rear plate 22.

The front plate 20 is provided with a central opening 24 while the rear plate 22 is provided with a similar, aligned opening 26. A pair of flexible diaphragms 28 and 30 of any suitable material, such as neoprene, are mounted between the frame 18 and the front and rear plate 20 to form a fluid tight chamber within the housing 16.

The diaphragm 28 is provided with a central aperture 36 over which is sealingly mounted a framework 38 having a central transparent window 40 made, for example, of glass or clear plastic. The front plate 20 is provided with a pair of horizontally extending members 42 and 44 into which are journaled pins 46 and 48 extending outwardly from the framework 38. This arrangement permits the framework 38 and window 40 to pivot about a horizontal axis relative to the housing 16.

In a similar manner, the diaphragm 30 has a central aperture 54 over which is sealingly mounted a framework 56 having a central transparent window 58. A pair of members 60 and 62 extend vertically from the rear plate 22 and are adapted to receive pins 64 and 66 extending outwardly from the framework 56 so that this member and its window 58 may be pivoted about a vertical axis for movement relative to the housing 16.

If desired, reinforcing plates 50 and 52 may be provided on the inner sides of the diaphragms 28 and 30, the framework 38 and plate 50 and framework 56 and plate 52 being bonded to the diaphragms 28 and 30 by a suitable adhesive and the various members being further connected together by screws 68, rivets, or other suitable holding means. Although the windows 40 and 58 are shown inserted in the frameworks 38 and 56, it should be understood that these frameworks and windows could be made integrally, taking, for example, the shape of a square or disk of transparent material large enough to more than cover the apertures in the diaphragms.

The front and rear plates of the frame 18 are suitably connected together as the bolts 70 and the interior chamber of the prism is filled with a transparent fluid 72 having a suitable index of refraction, an example of such fluid being water. The entire fluid cell 14 is mounted on the projector 10 by suitable means such as support bars 76.

Fastened to the framework 38 is one end of a lever 84, the other end of which is pivotally connected to one end of an arm 86. The other end of the arm 86 is coupled to any suitable electromechanical transducer, generally indicated at 88, and preferably taking the form of a loudspeaker voice coil and magnet assembly. As shown, the end of the arm 86 is connected by means of a stirrup 90 to the diaphragm 92 of the loudspeaker assembly 88. It can thus be seen that energization of the voice coil of the assembly 88 will cause movement of the arm 86 and lever 84 with the result that the framework 38 will pivot about a horizontal axis, causing a change in vertical angle of the variable angle prism assembly 12.

In a similar manner, the framework 56 has fastened thereto one end of a lever 96, the other end of which is pivotally connected to one end of an arm 98. The other end of the arm 98 is connected to another electromechanical transducer 100 which also preferably takes the form of a loundspeaker voice coil and magnet assembly. The arm 98 is connected by means of a stirrup 102 to the moving diaphragm 104 of this assembly. Energization of the voice coil of this assembly will cause the framework 56 to pivot about a vertical axis, thus changing the horizontal angle of the variable angle prism assembly 12.

FIGURES 4, 5 and 6 show the effect the pivotal movement of the framework 38 has on a beam of light passing through the variable angle prism assembly 12. In FIGURE 4, the framework 38 and window 40 are in their normal position parallel to the front plate 20, and a beam of light passing through the window 58, fluid 72 and window 40 is not deflected. In FIGURE 5, the framework 38 and window 40 have been pivoted in a clockwise direction with the result that the beam of light passing through the window 58, fluid 72 and window 40 is deflected downwardly as a result of the change of shape of the prism.

In FIGURE 6, the framework 38 and window 40 have been pivoted in a counterclockwise direction with the result that the beam passing through the window 58, fluid 72 and window 40 is deflected upwardly. This results from the fact that the shape of the prism 14 has been changed so that its base or thicker portion is now above the center of the beam. It can thus be seen that by mounting the windows 40 and 58 on a sheet of flexible sealing material, a variable angle prism is formed, the angle of the prism being determined by the angular or pivotal movement of the windows. It will be understood, of course, that the window 58 has the same effect on a beam of radiation as that shown for the window 40, but the deflection caused by the rear window 58 is in the horizontal plane rather than in the vertical plane.

FIGURE 8 shows a typical installation using the variable angle prism assembly of the present invention. In this figure, the projector 10 projects a beam of light to the variable angle prism assembly 12 onto a screen 114. Located immediately above the screen is a suitable photoelectric detector 116 which may include a photocell of conventional design, together with its related equipment. Similarly, a photoelectric detector 118 of similar construction is positioned on one side of the screen. The detector 116 is coupled by a suitable servo system 120 to the voice coil of the speaker assembly 88 while the detector 118 is coupled by a second servo system 122 to the voice coil of the loudspeaker assembly 100.

The detector 116 is positioned so that when the beam of light is properly centered vertically on the screen 114, the output of the detector 116 will be such that the voice coil and magnet assembly 88 will maintain the framework 38 and window 40 in a position parallel to the front plate 20. When, however, the beam of light moves higher or lower on the screen 114, the detector 116 will produce a greater or lesser output to cause the loudspeaker assembly to pivot the window 40 in a clockwise or counterclockwise direction respectively, thereby causing the beam of light to be deflected downwardly or upwardly until it is again centered on the screen.

The photoelectric detector 116 may be positioned to have the edge of the image, i.e., the frame line focused upon the center of the detector. If the image moves upwardly, more light will fall on the detector, and a corresponding signal will be transmitted to the servo system 120. Conversely, if the image moves downwardly, a smaller signal will be transmitted to the servo system. The use of the frame line as the reference point enables the correction of all image position errors rather than only projector errors. Consequently, even printer errors would be corrected by this form of operation. By using a pair of photo cells within the detector 116, one photo cell being positioned above the other with the frame line being just between the two photo cells when in the desired position, it is possible to provide a balanced output that is relatively independent of changes in the amount of light falling upon the detector. Thus, changes in density of the image adjacent the frame line due to image motion and scene changes will have substantially no effect. It will be appreciated that if only a single photocell is used, scene changes in which a very dark scene is followed by a very light scene may have the effect of apparently indicating a shift in the position of the image. In general, however, since the corrective action takes place over only a very few frames, there will not be substantial density changes to affect the registration accuracy of the servo or to cause picture jump. The various changes in density occuring will result only in relatively long term image position changes resulting from the changes in threshold value of the average density being sensed.

One method of overcoming the difficulty of density changes adjacent the frame line is by using so-called fiducial marks adjacent the frame line. The fiducial mark may be a small spot of constant density positioned to fall upon the detector 116 in such a way that any change in the amount of light falling on the detector is caused solely by movement of the image and not by reason of any change in density of the scene.

It will be realized that certain problems may arise in sensing the frame line or fiducial marks by reason of the "graininess" of the image and, in the case of the frame line, its out of focus representation. If the fiducial mark is a transparent mark or area, the effect of the "graininess" of the image will the reduced to a minimum. In the case of the frame line, the use of a longer length of the line will reduce the effect of the individual grains by providing an averaging effect. It may also be shown that if the sensing slit is not substantially wider than the expected movement of the image, substantial light modulation is obtainable despite the absence of a sharply focused edge.

Referring now to FIGURE 9, there is shown a schematic block diagram of a typical servo system that can be used to control the voice coil of either of the loudspeaker assemblies. In this system, the projector 10 projects a beam of light through the fluid cell 14 and then through a sheet of semi-reflective material 128 into the screen 114. The semi-reflective material 128 reflects a portion of the beam onto a detector 130, thus enabling the entire control system to be located in the projection booth rather than necessitating the physical location of the detectors at the screen. However, it will be recognized that with this arrangement, any movement of the projector and the detector as a unit will not be sensed by the detector, though the movement of the image on the screen may be excessive. Normally, this problem can be overcome by the rigid mounting of the projector 10, the detector 130, and the screen 114.

As indicated in FIGURE 9, the detector 130 includes a mask or similar means to insure that the frameline or the fiducial marks are properly projected onto a photo cell. The photo cell indicated in FIGURE 9 corresponds to one of the photo cells 116 or 118 of the system shown in FIGURE 8 and the operation of the two systems is substantially identical except for the location of the photo cells on the screen as shown in FIGURE 8 or adjacent the projection lens as shown in FIGURE 9. In each case, the output of the photo cell such as the photo cell 116 is fed to an amplifier 132 and then to a comparator and error amplifier 134. The output of the comparator and error amplifier 134 is fed to a contact 136 and 138 of a double pole, double throw switch 140. A pair of ganged switchblades 142 and 144 connect these contacts to a power amplifier 146 and to a memory 148 respectively. The output of the power amplifier 146 is fed to a voice coil 150 and is also fed back to an input of the comparator and error amplifier 134. In the alternate position of the switchblades 142 and 144, the switchblade 142 is connected to contact 158 which is connected to the memory 148 while the switchblade 144 is effectively disconnected.

The operation of the switchblades 142 and 144 is controlled by a relay coil 152. The energization of this relay coil 152 is controlled by the output of a multivibrator 154 which is passed through a driver amplifier 156. The output of the multivibrator 154 is controlled by a commutator mounted on the shutter drive shaft of the projector, for example, the commutator acting to periodically open a switch and cause the multivibrator to produce an output pulse to energize coil 152. In FIGURE 9, the relay coil 152 is shown in an energized condition causing the switchblades 142 and 144 to complete the circuits to contacts 136 and 138 respectively. When the relay coil 152 is de-energized the switchblade 142 engages the contact 158 of the memory 148 while the blade 144 does not complete any circuit.

FIGURE 10 illustrates the sequence of operation of the circuit shown in FIGURE 9. In this figure a line indicates that a switch is closed while a blank indicates that a switch is open. As can be seen, the commutator switch opens a short time after the projector shutter opens and closes a short time before the shutter closes. The opening of the commutator switch results in a multivibrator 154 producing an output voltage which is amplified in amplifier 156 and fed to the relay coil 152.

Energization of the coil 152 as a result of this pulse causes the switchblades 142 and 144 to complete circuits to contacts 136 and 138 respectively with the result that the output of the comparator and error amplifier 134 is fed to both the power amplifier 146 and the memory 148. The output of the amplifier 146 drives the voice coil 150 and is also fed back to the comparator and error amplifier 134. The comparator 134 compares this feed back signal with the amplified output of the detector 130. The voice coil 150 is driven by the output of amplifier 146 to cause the framework 38 and window 40 to pivot until the output of the detector 130 is substantially equal to the output of the power amplifier 146 whereupon the window 40 ceases movement. The memory 148 which may take any suitable form, such as a capacitor, stores the output of the comparator and error amplifier 134.

Just before the shutter closes, the commutator switch closes with the result that the multivibrator output pulse ceases and the relay coil 152 is de-energized. This results in the switchblades 142 and 144 moving away from and breaking the circuit to contacts 136 and 138 respectively, and switchblade 142 then completes a circuit to contact 158. The input of the power amplifier 146 is now connected to the memory 148 and the voice coil 150 remains energized at its previous level to maintain the beam in position until the shutter again opens.

As the shutter begins to open, the signal stored in the memory 148 after being amplified by the power amplifier 146 is compared to the signal produced by the output of the photo cell of detector 130, this comparison taking place in the comparator 134 and producing an error signal. As the shutter opens further, the commutator switch again opens and the multivibrator produces another output pulse energizing the coil 152 and moving the switchblades 142 and 144 to contacts 136 and 138 respectively. The amplifier 146 is now responsive to the error signal developed in the comparator and error amplifier 134 and drives the voice coil 150 and window 40 to eliminate this error.

The memory 148 will also be charged to a new level indicative of the new conditions. In this manner each frame of the motion picture film will be properly positioned on the screen, the compensating deflection taking place faster than the eye of the viewer can detect. Although only the circuit for controlling the voice coil 150 of the loud speaker assembly 88 is shown, it will be obvious that an indentical system is used to control the voice coil of the loud speaker assembly 100 in order to keep the beam centered horizontally as well as vertically.

In FIGURES 11 and 12 there is illustrated another form of variable refractor or prism consisting of a fluid cell whose sides are flexible. Thus FIGURE 11 is a horizontal sectional view of a fluid cell corresponding to FIGURE 3 and having a front window 40a pivotally mounted on pins 46a and 48a for rotation about a horizontal axis. The pins 46a and 48a are supported by trunnion mounts 42a and 44a respectively. The rear window is mounted for rotation about a vertical axis determined by pins 64a and 66a, which in turn are mounted in trunnion supports 60a and 62a. The forward and rear walls of the cell are essentially rigid but the sides are flexible to accommodate the movement of the front and rear faces. While various forms of flexible side walls may be used, one convenient form is a metallic bellows indicated by the numeral 160. Such bellows are well known and form a very convenient means of providing a flexible side wall construction.

A front elevational view of the fluid cell of FIGURES 11 is shown in FIGURE 12. In this figure, the horizontally projecting pins 46a and 48a and their respective trunnion mountings 42a and 44a are clearly shown as are the vertically aligned pins 64a and 66a which support the rear window for rotation about the vertical axis passing through the trunnion members 60a and 62a respectively. The lever 84a that pivots the front window 40a and the lever 96a that pivots the rear window are clearly shown.

The operation of the device shown in FIGURES 11 and 12 is substantially identical to that shown in FIGURES 1–7, but represents another form of construction which may be used.

In FIGURES 13 and 14 there is illustrated another form of construction making use of a reflector deflecting means instead of the refractor deflecting means shown in the previously described forms. In this reflector form of device, a pair of angularly positioned mirrors is used that reflectors the light twice, in the general manner of a periscope, so that neither reversal or inversion of the image is obtained. The mirrors are separately movable about perpendicular axes so that the image may be moved horizontal as well as vertically.

As indicated in FIGURE 13, a projector 10 projects the image carrying beam of light to a first angularly positioned mirror 200, this mirror being at such an angle that the light beam is reflected in a direction generally perpendicular to the original path of the beam, and thus for example may be reflected downwardly. A second mirror 201 in the downwardly directed path of the light beam intercepts the beam and redirects it horizontally toward the projection screen. The second mirror 201 like the first mirror 200 is angularly positioned and normally parallel to the first mirror. Each mirror is pivotal about an axis located in the plane of the mirror, the second or lower mirror 201 being pivotal above a horizontal axis 202 while the first or upper mirror is pivotal about an axis perpendicular to the horizontal axis.

When the mirrors 200 and 201 are parallel to each other, the light beam is offset and amount equal to the distance between the mirrors but continues in the same direction. When, however, the upper mirror 200 is pivoted a slight amount about its axis 203, the light beam is deflected horizontally as will be apparent from an inspection of FIGURES 13 and 14. Similarly when the lower mirror 201 is pivoted about its horizontal axis 202 the light beam will be deflected vertically. The lower mirror 201 is provided with an arm 84b that in turn is connected to a servo unit or driver 88b which acts to rotate the mirror in the same general manner that the front window 40 of the variable angle prism 12 of the first described form is moved. Similarly, the upper mirror 200 is provided with a lever 96b that in turn is driven by a servo unit 100b to control the vertical position of the image upon the screen. The servo units 88b and 100b are preferably controlled by systems substantially identical to those previously described.

It is possible, of course, to combine the movements of the two separate mirrors into a single mirror using gimbals or other suitable mounting for the mirror. The use of a single mirror will result in the reversal or inversion of the image but it is possible to correct for this by reversing the film within the projector.

The mirror or mirrors used in the reflective system should be optically exact without flaws or errors in them and preferably should be provided with a reflective coating on the front surface. Similarly, the windows 40 and 58 of the refractive forms of devices should likewise be without optical flaws or defects so that no errors are introduced into the optical system.

From the foregoing description it can be seen that a projection system has been provided that eliminates vertical and horizontal fluctuations of a beam projected onto a screen. The system utilizes reflective or refractive assemblies which act to deflect the projected beam to compensate for deflections caused either by aberrations in the projector or by outside influences. Each of the assemblies is inexpensive to manufacture and may easily be installed on presently existing projection equipment.

The assembly has only a few very simple moving parts and is thus extremely reliable and long lasting in operation. While the present invention has been described in connection with a projection system for motion pictures, it will be obvious that it is useful in any system wherein it is desired to control the path followed by a projected beam of energy.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes that come within the meaning and range of equivalency of the claims are therefore intended to be embraced therein.

I claim:
1. A variable angle prism for controlling the position of the projected image of a motion picture projector comprising:
   a housing, the walls of said housing defining a chamber therein, opposite walls of said housing having openings therein;
   first resilient sealing means positioned over a first of said openings and fastened to said housing to form a seal therewith, said means including a first transparent window therein;
   first means for pivotally connecting said first window to said housing;
   second resilient sealing means positioned over the second of said openings and fastened to said housing to form a seal therewith, said means including a second transparent window therein, said second window being aligned with said first window;
   second means for pivotally connecting said second window to said housing;
   a body of transparent fluid disposed in said chamber between said sealed openings; and
   first and second electromechanical control means coupled to said first and second resilient means respectively for causing pivotal movement of said first and second windows relative to said housing.

2. A variable angle prism for controlling the position of the projected image of a motion picture projector comprising:
   a housing, the walls of said housing defining a chamber therein, opposite walls of said housing having openings therein;
   first resilient sealing means positioned over a first of said openings and fastened to said housing to form a seal therewith, said means including a first transparent window therein;
   first means for pivotally connecting said first window to said housing;
   second resilient sealing means positioned over the second of said openings and fastened to said housing to form a seal therewith, said means including a second transparent window therein, said second window being aligned with said first window;
   second means for pivotally connecting said second window to said housing, said second pivotal means being disposed substantially perpendicular to said first pivotal means whereby said windows pivot about substantially perpendicular axes;
   a body of transparent fluid disposed in said chamber between said sealed openings; and
   first and second electromechanical control means coupled to said first and second resilient means respectively for causing pivotal movement of said first and second windows relative to said housing.

3. A variable angle prism for controlling the position of the projected image of a motion picture projector comprising:
   a housing, the walls of said housing defining a chamber therein, opposite walls of said housing having first and second openings therein;
   a first sheet of resilient sealing material positioned over the first of said openings and fastened to said housing to form a seal therewith, said sheet having an aperture therein;
   a first transparent window sealingly mounted on said sheet over said aperture;
   first means connecting said first window to said housing, said means being pivotally mounted in said housing about a vertical axis;

a second sheet of resilient sealing material positioned over the second of said openings and fastened to said housing to form a seal therewith, said sheet having an aperture therein;

a second transparent window sealingly mounted on said sheet over said aperture, said second window being aligned with said first window;

second means connecting said first window to said housing, said means being pivotally mounted in said housing about a horizontal axis;

a body of transparent fluid disposed in said chamber between said sealed openings; and first and second electromechanical control means coupled to said first and second windows respectively for causing pivotal movement of said windows relative to said housing.

4. The apparatus of claim 3 wherein said transparent fluid is water.

5. The apparatus of claim 3 wherein said electromechanical control means each comprises a member having one end fastened to said window in a direction normal to the pivotal axis thereof, and the other end connected to the moving element of an electromagnet.

6. A system for stabilizing the path of the image projected by a motion picture projector, comprising in combination:

means for projecting said image;

means for reflecting a portion of said image;

detector means responsive to said reflected portion of said image for producing an output signal indicative of the position of the image;

deflecting means interposed between said projecting means and said reflecting means, said deflecting means comprising:

a housing, the walls of said housing defining a chamber therein, opposite walls of said walls having openings therein;

first resilient sealing means positioned over a first of said openings and fastened to said housing to form a seal therewith, said means including a first transparent window therein;

second resilient sealing means positioned over the second of said openings and fastened to said housing to form a seal therewith, said means including a second transparent window therein, said second window being aligned with said first window, both of said windows being positioned in the path of said image;

a body of transparent fluid disposed in said chamber between said sealed openings; and control means coupled to said first resilient means for causing movement of said first window relative to said housing;

said control means being coupled to said detector means and actuated thereby whereby said first window of said deflecting means is moved to offset deflection of the image.

7. A system for stabilizing the position of an image projected on a screen by a motion picture projector, comprising in combination:

means intermediate said projector and said screen for reflecting a portion of said image;

detector means responsive to said reflected portion for producing an output signal indicative of the position of the image;

deflecting means interposed between said projector and said reflecting means, said deflecting means comprising:

a housing, the walls of said housing defining a chamber therein, opposite walls of said housing having openings therein;

first resilient sealing means positioned over a first of said openings and fastened to said housing to form a seal therewith, said means including a first transparent window therein;

first means for pivotally connecting said first window to said housing;

second resilient sealing means positioned over the second of said openings and fastened to said housing to form a seal therewith, said means including a second transparent window therein, said second window being aligned with said first window, both of said windows being positioned in the path of said projected image;

second means for pivotally connecting said second window to said housing, said second pivotal means being disposed substantially perpendicular to said first pivotal means whereby said windows pivot about substantially perpendicular axes;

a body of transparent fluid disposed in said chamber between said sealed openings; and first and second electromechanical control means coupled to said first and second resilient means respectively for causing pivotal movement of said first and second windows relative to said housing;

said control means being coupled to said detector means and actuated thereby whereby said windows of said deflecting means are moved to offset any deflection of the image.

8. A system for stabilizing the position of an image projected on a screen by a motion picture projector, comprising in combination:

first detector means responsive to said projected image for producing an output signal indicative of the horizontal position of said image;

second detector means responsive to said projected image for producing an output signal indicative of the vertical position of said image;

deflecting means interposed between said projector and said detector means, said deflecting means comprising:

a housing, the walls of said housing defining a chamber therein, opposite walls of said housing having first and second openings therein;

a first sheet of resilient sealing material positioned over the first of said openings and fastened to said housing to form a seal therewith, said sheet having an aperture therein;

a first transparent window sealingly mounted on said sheet of said aperture;

first means connecting said first window to said housing, said means being pivotally mounted in said housing about a vertical axis;

a second sheet of resilient sealing material positioned over the second of said openings and fastened to said housing to form a seal therewith, said sheet having an aperture therein;

a second transparent window sealingly mounted on said second sheet over said aperture, said second window being aligned with said first window, both of said windows being positioned in the path of said image;

second means connecting said second window to said housing, said means being pivotally mounted in said housing about a horizontal axis;

a body of transparent fluid disposed in said chamber between said sealed openings; and first and second electromechanical control means coupled to said first and second windows respectively for causing pivotal movement of said windows relative to said housing;

said first electromechanical control means being coupled to said first detector means and actuated thereby whereby said first window of said deflecting means is moved to offset any horizontal deflection of the image;

said second electromechanical control means being coupled to said second detector means and actuated thereby whereby said second window of said deflecting means is moved to offset any vertical deflection of the image.

References Cited

UNITED STATES PATENTS

| | | | |
|---|---|---|---|
| 2,300,251 | 10/1942 | Flint | 88—57 |
| 2,481,600 | 9/1949 | Harrison | |
| 2,504,039 | 4/1950 | O'Leary | 88—1 |
| 2,563,892 | 8/1951 | Waller et al. | 352—70 |
| 2,930,668 | 3/1960 | Behrmann | 88—24 |
| 3,161,718 | 12/1964 | De Luca | 88—57 |

FOREIGN PATENTS

| | | |
|---|---|---|
| 213,449 | 7/1960 | Austria. |
| 1,077,547 | 5/1954 | France. |
| 628,774 | 4/1936 | Germany. |
| 823,404 | 11/1959 | Great Britain. |
| 917,851 | 2/1963 | Great Britain. |

JULIA E. COINER, *Primary Examiner.*

NORTON ANSHER, *Examiner.*

H. H. FLANDERS, *Assistant Examiner.*